United States Patent [19]

Ames

[11] Patent Number: 4,672,222

[45] Date of Patent: Jun. 9, 1987

[54] OCEAN WAVE ENERGY CONVERTER

[76] Inventor: P. Foerd Ames, 2 Rhode Island Ave., Providence, R.I. 02906

[21] Appl. No.: 782,798

[22] Filed: Mar. 13, 1986

[51] Int. Cl.⁴ .............................................. F03B 13/12
[52] U.S. Cl. ...................................................... 290/53
[58] Field of Search ................................... 290/42–44, 290/52–54; 60/495–507; 417/330–334

[56] References Cited

U.S. PATENT DOCUMENTS

| 250,104 | 11/1881 | Roberts | 60/505 |
| 3,898,471 | 8/1975 | Schera, Jr. | 290/53 X |
| 3,930,168 | 12/1975 | Tornabene | 290/53 |
| 3,964,264 | 6/1976 | Tornabene | 290/53 X |
| 4,145,885 | 3/1979 | Solell | 290/53 |
| 4,232,230 | 11/1980 | Ames | 290/53 |

FOREIGN PATENT DOCUMENTS 8100284 2/1981 PCT Int'l Appl. .................. 290/53

Primary Examiner—William M. Shoop, Jr.
Assistant Examiner—W. E. Duncanson, Jr.

[57] ABSTRACT

A self-stabilized and modularly expandable system of independently operative point absorbers with respective drive transmissions and electrical generators produces electricity from wave motion on a body of water.

14 Claims, 5 Drawing Figures

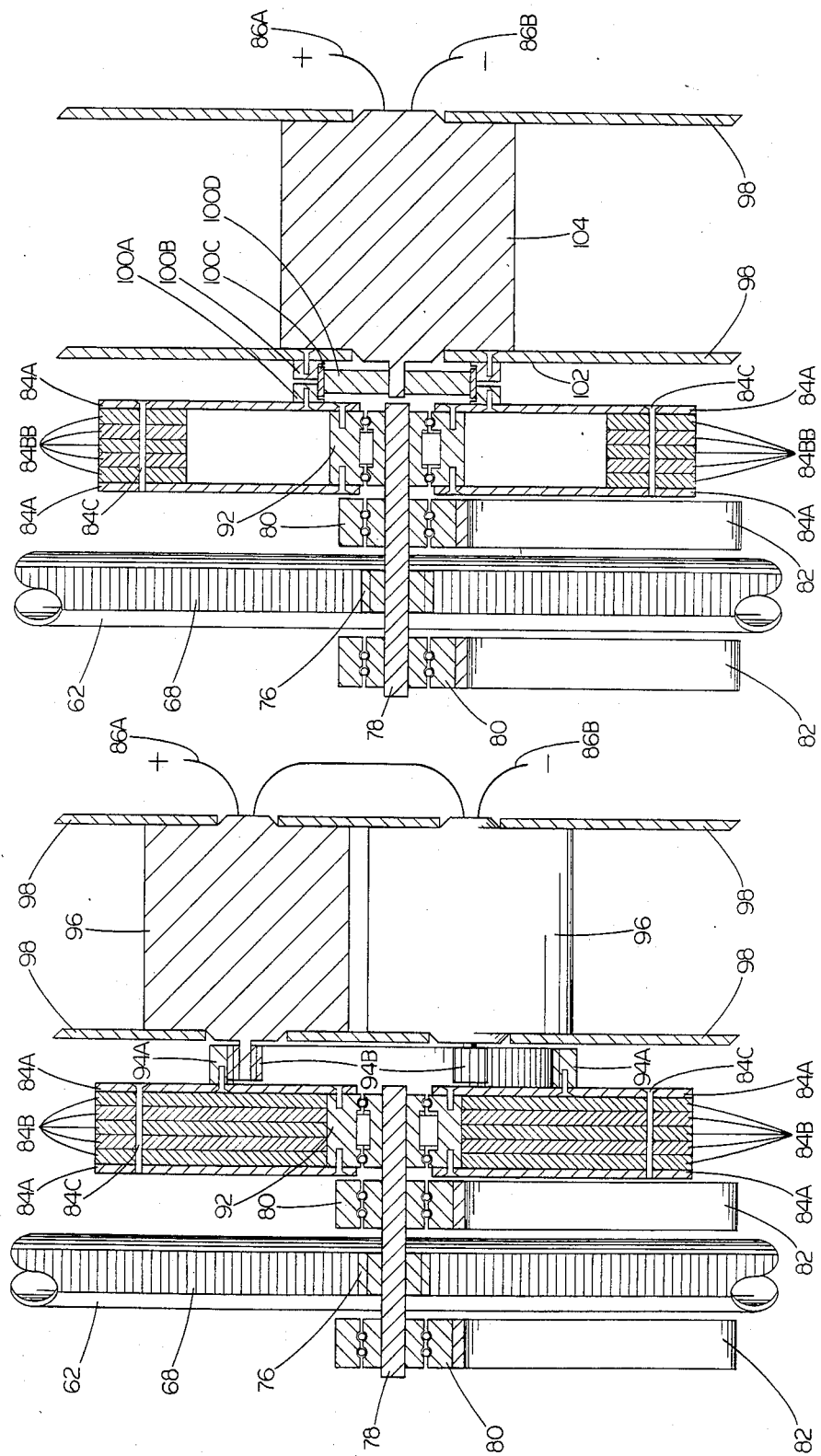

OCEAN WAVE ENERGY CONVERTER

BACKGROUND TO THE INVENTION

Mans' involvement with the oceans is steadily growing and changing. Once used strictly as a medium of transport and source of nourishment, the oceans are now considered as a last, earthbound frontier for continued sustenation. As industrial development of this unsettled environment advances, a need arises for energy systems which provide electrical service power for remote area applications such as signalling and monitoring equipment, resource recovery operations, and large scale desalination processes or hydrogen production. Autonomous systems are needed to supplant present methods of onshore/offshore electrical provision for these methods are dependent on regeneration from land based sources. For example, the practice of using battery powered audio/visual signalling or data acquisition equipment can require a user to execute repeated service and component replacement operations during a performance period. The frequency of these costly maintenance procedures is extensively reduced when utilizing the indigenous power generation means provided by an apparatus for converting the hydrokinetic energy of water wave fluctuations to electrical energy. Wave motion has long been recognized as a substantive resource and invention relating to this subject is copious. However, commercial development and utilization has been greatly restrained due to the inherent functional limitations of various prior devices. One common disadvantage is the absence of design consideration for modulation by which methodology a basic module is interconnected to other similar modules thus forming a system array. With some exception, the field is replete with devices comprising unitary non-systems that would not advantageously utilize the diffuse, planar expanses of fluctuative energy which embody the wave environment. Such devices are exemplified in the Schera, Jr. U.S. Pat. No. 3,898,471 and the Tornabene U.S. Pat. Nos. 3,930,168 and 3,964,264.

In one embodiment of the Schera, Jr. U.S. Pat. No. 3,898,471, there is disclosed a float operated electrical generator consisting of a vertical slotted member 28 enclosing a movable rack 37 with attached float 29, said rack 37 being retained in engagement to a pinion gear 36 mounted on the driveshaft of a stationary electrical generator 34. Although shown supported by a concrete base 1, the apparatus may be affixed to the side of a dock, boat, or other marine structure. In operation, wave induced reciprocal float/rack movement causes bidirectional rotation of the gear/generator and electricity is produced for signalling functions. Although conversion is direct, the absence of kinetic energy storage reduces electrical generation frequency during float/rack stroke reversal and provides no accumulation of stored energy as resultant from the input of successive strokes. Furthermore, deployment of the apparatus is limited to the availability of the aforementioned support structures.

One embodiment of the Tornabene U.S. Pat. No. 3,930,168 describes a wave actuated float 16 of sufficient water displacement capacity and dense mass to enhance inertia and momentum during upward and downward movements, said float 16 being attached, in non-binding mode, to a vertically reciprocable shaft 26 retained by bearings 27,28 in a structure embedded in the sea floor and in a structure extending out of the water 34,40, said outwardly extending structure being joined to said submerged structure by supports 35. The shaft 26 carries a rack in driving engagement to a gear 37 affixed on a common axle 38 between two electrical generators 39 disposed on said outwardly extending structure platform 34. This embodiment is essentially similar in operation to the Schera, Jr. U.S. Pat. No. 3,898,471 with exception of the non-binding float/shaft connection and the optional provision of dense mass associated with the float for increasing downward forces of the shaft. Rather than improving electrical generation efficiency, however, such an associated float mass impedes upward float/shaft movement after submergence. Conversely, downward forces of the dense mass are partially negated by float lift. Resultantly, the reciprocation frequency of the float is lower than ambient wave frequency thus causing partial cessation and slower output speeds during normal operation. Additionally, as evidenced in a Schera, Jr. U.S. Pat. No. 3,898,471 embodiment, the necessity of extensive ground attachment means for supporting the energy converting mechanisms limits deployment of the apparatus to relatively shallow waters.

The Tornabene U.S. Pat. No. 3,964,264 identifies a wave action undersea drilling rig which does not relate to the mechanisms or functions of the present invention.

The second preferred embodiment of the Solell U.S. Pat. No. 4,145,885 defines an elongated housing 102 mounted on columns 104 above a body of water and extending perpendicularly to the direction of wave travel, said housing 102 therein supporting a plurality of vertically reciprocable racks 120 by bearings 122,124, said racks 120 being equipped, at the lower end, with respective floats 112. Two elongated driveshafts S1,S2 are commonly engaged to the rack 120 plurality of respective overrunning clutch gears 148,150 so that upward rack movement drives one shaft and downward rack movement drives the other shaft in the opposite direction of rotation. A common output shaft S0 is suitably connected with the driveshafts S1,S2 to be thereby driven in one direction of rotation. Accordingly, this shaft may be connected to a generator, pump, or other device. The mechanical unification of disparately operative point absorbers attributes to centralization of energy conversion means which must be responsive to extensively variable force inputs ranging from slight movement of a single point absorber to substantial movement of all point absorbers. The absence of suitable transmission or momentum storage means for accommodation of variable force inputs reduces the efficiency of the device when optimal wave conditions are not present. As described in prior art, utilization of the device is functionally dependent on rigid, ground connected structures for maintaining the housing with components above water level. Furthermore, omnidirectional deployment of a wave motor plurality along the horizontal plane covers and dampens the source of energy from which they operate.

The Paolucci International Pat. No. WO 81/00284 shows an elongated housing 5,30 positioned above a body of water by anchored buoys 20,36 with supports 19. The housing 5,30 contains an elongated, rotary driveshaft 2 provided with several ratchet sprocket wheels 8a,8b in respective engagement to a plurality of vertically reciprocable drive assemblies 14 with respective floats 18 disposed at the lower end. A drive assembly 14 is arranged to impart unidirectional driveshaft 2 rotation irrespective of reciprocation direction. For this purpose, the drive assemblies 14 are sufficiently weighted for equalizing power take-off from the buoyancy force in the upward direction and the gravity force in the downward direction. Accordingly, the ends of the driveshaft 2 are connected to counter-rotating flywheels 31,33 which are, in turn, connected to respective electrical generators 6 mounted in the housing 30. Although forming no part of claimed matter, a transmission 34 is shown between a flywheel 31,33 and generator 6 for changing the speed of rotation as desired. The use of neutral stabilization means such as anchored buoys 20,36 forms an improvement in selfsustention capability over the Solell U.S. Pat. No. 4,145,885 and other art. However, separation of the neutral buoyancy maintenance function 20 from the above water housing provision function 5,30 renders unnecessary structural redundancy and dampens wind generated surface wave activity. Deployment of additional drive assemblies 14 and anchored buoys 20,36 along the common output driveshaft 2 is limited to uniaxial connections which necessitate replacement of the flywheels 31,33, transmission 34, and generators 6 for accommodation of the reformed kinetic energy input range. The provision of flywheels 31,33 diminishes start-up torque loading and moderates continuous output rotational velocity from the kinetic energy storage and accumulation of successive drive assembly 14 strokes though, as described for the Solell U.S. Pat. No. 4,145,885, efficient conversion of the extensive input force range remains problematic. Additionally, the use of float associated dense mass for increasing downward momentum causes wave/float frequency matching obstacles similar to those elucidated for the Tornabene U.S. Pat. No. 3,930,168.

The Ames U.S. Pat. No. 4,232,230 discloses a modular assembly of reciprocating electrical generators arranged as edge elements of a tetrahedron, said respective generator outer portions comprising tubular members 1 joined in non-intersecting relationship by a common block 2 near the apex and by respective lower brackets 5 affixed to a common damper plate 4 with movable ballast weights 6. A closed air chamber 3 is secured to the tubes 1 below the block 2 for maintaining neutrally buoyant suspension of the assembly with respect to the mean sea surface. Each generator inner portion consists of bearings 11 supporting a coaxial rod 7 provided, at its upper end, with a respective float 8 of spherical shape. A sealable bellows sleeve 12 is suitably mounted on a rod 7 and tube 1 for providing flexible closure. Each rod 7 carries a plurality of longitudinally spaced permanent magnets 10. A plurality of coaxially extending coils 15 are located about a rod 7 and magnets 10 within a tube 1 so that an associated magnet 10 moves from positions enclosed by a coil 15 to positions outside of coil 15 during normal reciprocation. The coils 15 of a generator are series-connected to a rectifier 21 and capacitor 19 which are, in turn, seriesconnected to other rectifier coils 15 of a module and to conductors 15A contained in upper tubes 17 connecting to other modules of an array or to external utilization means. Accordingly, respective lower module portions are suitably interconnected by brackets 5 to form a module array of any desired quantity. In operation, wave procession raises and lowers the floats 8 and respective rod 7 and magnet 10 assemblies through the coils 15 which are maintained relatively stationary in the air chamber 3 by the associated damper plate 4. This relative movement induces pulses of electromotive force in the coils 15 which are additively combined with the outputs of other independent generators by the described series-connection. The functional unification of energy conversion means housing and neutral buoyancy maintenance by the air chamber eliminates the type of structural redundancy evidenced in the Paolucci Pat. No. WO 81/00284 while providing a self-stabilized and modularly expandable system of independently operative generators which requires only light bottom anchorage to counteract off-station drifting. Additionally, deployment of modules below the water surface negates the interference and dampening of wind generated surface wave activity on the working floats 8, as evidenced in the Solell U.S. Pat. No. 4,145,885 and the Paolucci International Pat. No. WO 81/00284. The fully independent operation of the floats 8 and associated generators also serves to limit variability of engaging input forces resulting in a more efficient conversion range while providing centralized accumulation of electrical energy rather than kinetic energy. Furthermore, the use of electrical energy transmission and storage means becomes increasingly more efficient than kinetic energy transmission and storage means with expansion of a module array over relatively large areas. In addition to the structural advantages of a tetrahedral module, the implementation of respective inclined reciprocation axes geometrically extends the length of stroke by nearly 20% relative to the vertical axes shown in the prior art. If suitably positioned relative to wave direction, the inclined axes also expand the floats' capture width by 33% due to their simultaneous absorption of both the vertical force component of buoyancy and the horizontal time component of float 8/wave crest engagement with respect to wave procession. This feature greatly improves the wave-following capability of a float 8 while sustaining applied loads such as from generator elements or other energy conversion means.

Reduction to practice included wave tank testing of a working model according to this invention. This test was performed for observing the mechanical and electrical operations under controlled conditions. Although considered successful, the test indicated several deficiencies which included the float 8 shape with regard to wave engagement. Evidently, the spherical shape of respective floats 8 provided little tangential surface resistance to water particle motion while promoting a variable submergence rate which resulted in the establishment of a non-resonant float 8 actuation delay. Often, this delay nullified reciprocation of the rods 7 and associated magnets 10 due to their antiphasal movement with the ambient wave field. This condition indicated that improved wavefollowing capability could be derived from float 8 shapes having low centers of buoyancy and maximal planar contact with the hydroface. Actuation time delay was augmented by the direct use of float 8 displacement for raising and lowering associated linear magnet 10 arrays through the coils 15. Although energy conversion was very direct, the weight of float 8 associated magnet 10 arrays caused wave/reciprocation frequency matching problems similar to those percieved and described for the Tornabene U.S. Pat. No. 3,930,168 and the Paolucci International Pat. No. WO 81/00284. This linear generator was also inefficient due to the necessary provision of a relatively large quantity of longitudinally spaced magnets 10 in relation to the number of coils 15 so that, at any instant during normal reciprocation, at least some of the magnets 10 would move from positions into and out of the coils 15.

Furthermore, the arrangement did not utilize kinetic energy storage and accumulation of successive strokes for increasing continuous electrical generation. Resultantly, power generation was diminished during stroke reversal and start-up. These linear generator problems indicated that enhanced electrical production could be obtained from means for converting the respective rod 7 reciprocable motion to rotary motion of kinetic energy storage and transmission means which propel standard generators. Therefore, an object of the present invention is to overcome and/or obviate the difficulties and disadvantages of prior art by provision of an ocean wave energy converter which utilizes various improvements and advantages, to be further described.

SUMMARY OF THE INVENTION

In a preferred embodiment of the invention, there is provided a submerged assembly of tubular members approximately forming edge elements of a regular tetrahedral frustum, said members terminating at the lower ends in brackets forming vertices of an equilateral triangle and carrying fastener means for connection to brackets of other respective modules and to lower framing members forming edges of an equilateral triangle to which optional damper plates may be mounted, and there being further provided a lower portion of a buoyancy chamber joined to the upper terminals of respective tubular members, said lower chamber portion being sealably affixed to an upper chamber portion for enclosing a volume of air above the aforementioned elements to suspend the assembly at suitable depth with respect to the hydroface, and there being further disposed an annulated receptacle plate and ring sealably affixed to the uppermost surface of the buoyancy chamber enclosure forming terminal fastener means about the annulus for connection of upper framing members to similar fastener means of other respective modules, and there being further incorporated thereon a receptacle plate a trimetric arrangement of truncated right circular cylinders extending outwardly in non-intersecting relationship and coaxial alignment with respective tubular members, said cylinders and upper portions of said tubular members being provided therein with respective suitable slide bearings supporting a reciprocable driveshaft with coaxially extending rack, the extreme lower end of said driveshaft being equipped with a stop to compress spring elements adapted about and below the driveshaft and secured within tubular members for limiting and absorbing driveshaft strokes, and there being disposed about the driveshaft and sealably affixed near said driveshaft upper end and near said truncated cylinder upper end a reinforced bellows sleeve with respective sealed cuffs forming flexible closures between said ends, and there being attached at the extreme upper end of said driveshaft a universal or flexible joint being further attached to the lower portion of a respective float by an extended neck flange, said lower float portion being of planar form and sealably affixed to an upper float portion of hemispherical form, with the interior defined therein being comprised of closed cell foam, and said float being adapted to follow fluctuations of the hydroface for imparting reciprocative movement to said driveshaft and rack, and there being in driven engagement therewith, within the buoyancy chamber, a respective gear fixed on a freely rotatable axle secured in proper orientation by suitable bearings mounted on braces affixed to the lower buoyancy chamber inner wall, with there also being provided near an end of said rotatable axle, an overrunning clutch supporting a disk wheel of appropriate weight distribution for imparting self-rotation and rotation of a respective transmission and an associated electrical generator driveshaft or plurality thereof, the electrical output leads of which are suitably combined with other generators within a module and a module array through upper framing member conductors that connect to a single pair of output terminals, and there being further optional provision of similar, though proportionately diminished, transmission and generation means operating independently of the aforementioned transmission and generation means for optional inner and inter module servomechanism functions. Electricity is produced as waves engage the structure or plurality thereof.

BRIEF DESCRIPTION OF THE DRAWINGS

The invention is herein described with reference to the accompanying drawings, wherein:

FIG. 3 is a combined front elevation and section view of one assembly of energy converting elements.

FIG. 4 is a combined front elevation and section view of an alternate preferred assembly of energy converting elements.

DETAILED DESCRIPTION OF THE PREFERRED EMBODIMENTS

Figures 1, 2:
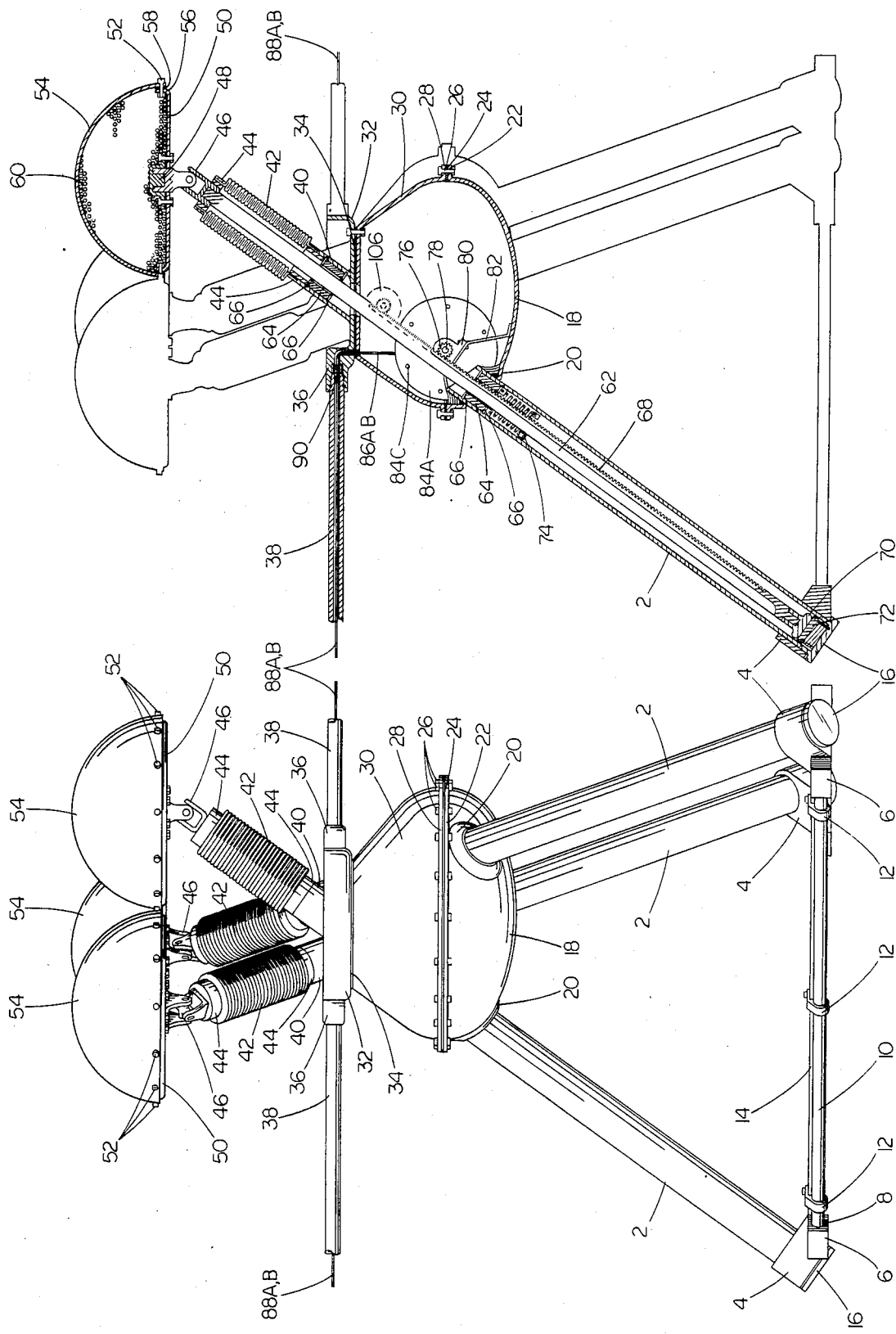
FIG. 1 is a side elevation view of a converter module in accordance with this invention.
FIG. 2 is a side section view of a converter module broken away to display internal details.

The ocean wave energy converter illustrated in FIG. 1 includes three tubular members 2 relatively arranged as surface elements of a conical frustum or, more specifically, as edges of the sides of a regular tetrahedral frustum with their associated longitudinally extended major axis lines crossing in non-intersecting relation about the apex. The lower ends of the tubes 2 are fixedly secured within receptacles 4 by any of a variety of connection means including engaging threads or mechanical locking devices or adhesives. The receptacles 4 are suitably assembled or fused with brackets 6 projecting outwardly of sufficient extent for provision of terminals 8. Preferably, the brackets 6 are formed on each side of a receptacle 4 so that their terminals 8 align in parallel relation with the other bracket terminals 8 of a module. Accordingly, the ends of elongated framing members 10 are attached within and between respective terminals 8 thereby interconnecting the receptacle 4 plurality in equilateral triangular relation. The closed framing members 10 are provided, at spaced-apart distances along their length, with clamping means 12 for securing a damper plate 14 of equilateral triangular form. The mounted damper plate 14 is optionally removable from the framing members 10 by loosening of the clamping means 12. A receptacle 4 lower end is sealed by a removable cap 16 equipped with a shock absorber 72 (FIG. 2). The upper tube 2 ends are extended through equicircumferentially spaced openings in the wall of a lower buoyancy chamber shell 18. The openings are strengthened by articulation means 20 comprising molded bosses or affixed collars or these elements in combination. The tubes 2 are connected to the shell 18 in accordant manner to the type of opening articulation means 20 used with, for example, a high strength joint including an extended neck flange and mat and strand bonds with waterproof epoxy seals formed around and affixed to a tube 2 end and the interior and/or exterior shell 18 opening. The edge perimeter of the lower buoyancy chamber shell 18 is molded into a flange 22 of sufficient outward protrusion for carrying a gasket 24 and a plurality of equispaced clamping devices such as screw clamps or fasteners 26 for attachment to the mating flange 28 of an upper buoyancy chamber shell 30. The upper shell 30 is tapered to a form generally resembling a right circular conical frustum, usually, of a coincident inclination angle with the tubes 2 regular tetrahedral angles. The upper shell 30 terminates at a circular face of sufficient surface area for carrying an annulated receptacle plate 32, to be further described. A gasket pad 34 is disposed between said faces to provide waterproof sealing. The annular portion of the plate 32 is built with a plurality of articulated brackets 36 provided with receptacle coupling means 90 (FIG. 2) for quick connection or disconnection of upper framing members 38. The face portion of the plate 32 is built with a plurality of truncated right circular cylinders 40 extending outwardly in non-intersecting relationship. This plate assembly is bolted to the upper shell 30 face in an appropriate position for situating the respective truncated cylinder 40 major axes in coaxial alignment with the associated tube 2 major axes. The lower cuff of a flexible bellows sleeve 42 is sealably affixed to a respective cylinder 40 by clamping means or labyrinth cuffs or waterproof epoxy or these sealing elements 44 in combination. The sleeve 42 portion extends upwardly in surrounding disposition with a driveshaft 62 (FIG. 2) and terminates at an upper cuff sealably affixed, by similar means, near said driveshaft 62 upper end. The extreme upper end of a respective driveshaft 62 is fixed with a suitable universal joint 46. For purposes of illustration, a cardan type is shown, though, the function of this component permits the use of a joint of simpler construction such as a stranded cable connector with stops or other flexible joint. The other end of a universal or flexible joint 46 is attached to an extended neck flange 48 in further attachment to a lower float shell 50 of generally disklike form. The edge perimeter of a lower float 50 is molded into a flange 56 (FIG. 2) of sufficient upward protrusion for carrying a gasket 58 (FIG. 2) and a plurality of equispaced clamping devices such as screw clamps or fasteners 52 for attachment to the edge perimeter of an upper float shell 54. Preferably, the upper shell 54 is shaped to the general form of a hemisphere of appropriate radial length for prohibiting contact interference with other respective float shells 54 during operation. In combination, these elements provide closed positive buoyancy means responsive to surface waves on a body of water.

The side section view of FIG. 2 reveals internal elements of FIG. 1 such as a typical connection of a lower float shell flange 56 to an upper float shell 54 by fasteners 52 with the mutual contact surface area defined therebetween being provided with a compressible gasket 58 for sealing the closed volume defined therein against water infiltration. The float interior is further provided with closed cell foam 60 for prohibiting water infiltration in the event that either of the float shells 50,54 is broken or punctured. The foam 60 is preferably lightweight but of appropriate density for strengthening the float against destruction in the event of contact interference with other bodies. As a result, the wall thickness and overall weight of the float shells 50,54 may be decreased without loss of shell 50,54 strength. FIG. 2 further shows the connection of a float 50,54 to a driveshaft 62 by a universal or flexible joint 46 and the surrounding disposition and attachment of a respective bellows sleeve 42 to said driveshaft 62 upper end and to said receptacle plate 32 cylinder 40 by clamping means 44 and/or other waterproof sealing elements. A driveshaft 62 is supported in contact rolling engagement to linear slide bearings 64 positioned within the associated receptacle plate 32 cylinders 40 and the upper ends of the tubes 2 near the lower buoyancy chamber shell 18 opening articulation means 20. The bearings 64 are fixed with retaining rings 66 thereby providing dual rolling contact support points of sufficient spaced-apart distance for reducing or eliminating driveshaft 62 flexure when fully retracted or extended. Preferably, the bearings 64 are self-lubricating and of the open type with said openings directed inwardly in coaxial alignment. A rack 68 is slip-fitted and connected to a backing plate within the associated driveshaft 62 so that the teeth of said rack 68 protrude from the driveshaft 62 perimeter into the bearing 64 openings thus inhibiting undesirable axial torque in normal operation. Torque may be further mitigated by provision of a freely rotatable universal or flexible joint 46 connection of a float 50,54 to a driveshaft 62 upper end. The lower end of a respective driveshaft 62 is threaded and equipped with a removable stop 70. A stop 70 is ferruled to provide positive contact with shock absorbers 72, 74. One shock absorber 72 is located below the stop 70 and affixed to a receptacle 4 cap 16. The other absorber 74 is located within and affixed to the tubular members 2 below the respective bearings 64. This absorber 74 spring element surrounds a driveshaft 62 for limiting its upward stroke and reducing shock loading on the bearings 64. Accordingly, a spur gear 76 is maintained in constant engagement to a respective rack 68 at a contact point between the associated bearings 64 within the buoyancy chamber 18,30. The gear 76 is furnished with a bore and keyway in which an axle 78 with keyway is slip-fitted. A typical square key is force-fitted in the aligned keyways thus producing a positive connection between a gear 76 and axle 78. An axle 78 is suitably positioned in rolling contact engagement with radial anti-friction bearing pillow blocks 80 mounted on braces 82 affixed to the lower buoyancy chamber shell 18. Preferably, the bearings 80 with braces 82 are located in proximity to each gear 76 side but of appropriate spaced-apart distance for supporting a cantilevered load with minimal axle 78 deflection, to be further described. Accordingly, the axle 78 projects from the side of a bearing 80 opening of sufficient extent for carrying a flywheel 84. FIG. 2 further shows a single pair of electrical leads 86a,b ascending from behind the flywheel 84 and passing through coaxially aligned openings in the upper buoyancy chamber shell 30, gasket pad 34, and receptacle plate 32 brackets 36. These leads 86a,b are diagrammatically represented in directly connected relation with electrical conductors 88a,b contained in a respective framing member 38. In corporeality, however, individual leads 86a,b are series-connected to the other leads within a module preceding attachment to the conductors 88a,b. The components of a quick disconnect coupling 90 are suitably affixed within bracket 36 receptacles and to the ends of upper framing members 38. A coupling 90 is modified to provide waterproof closure means for sealing the electrical leads 86a,b and conductor 88a,b terminals from water penetration when detached.

In further detail, FIG. 3 shows a typical energy converting assembly in driven engagement with the aforementioned driveshaft 62 and rack 68. Some elements of the assembly comprise the aforementioned axle 78 support means such as radial bearing pillow blocks 80 mounted on braces 82 in close relation to each side of the interposed gear 76 and driveshaft 62/rack 68 but of sufficient spacedapart distance for maintaining equilibrium and minimizing bending stress on the axle 78 when subjected to end loading. FIG. 3 further shows the axle 78 projection from one side of a bearing pillow block 80 opening of adequate length for carrying a flywheel 84. An exemplary flywheel 84 is suitably affixed to the axle 78 end by an overrunning clutch 92. Preferably, the clutch 92 is furnished with numerous specially shaped sprags which provide positively engaging load points between inner and outer races in one direction of rotation and lift-off disengagement in the opposite direction of rotation, whereby, rubbing contact and wear of the sprags and races is virtually eliminated. Accordingly, flywheel mounting support frames 84a of generally disklike shape are conventionally attached to one or both ends of the clutch 92. The support frames 84a are constructed with central openings of slightly larger diameter than the clutch 92 inner race diameter so as to eliminate rubbing contact with the axle 78 in normal operation. A plurality of discrete weights 84b are fixedly superposed between support frames 84a by screw clamps or other fastening means 84c. Usually, the weights 84b are shaped as relatively thin cylinders with suitable inner diameters for being friction-fitted about the clutch 92 outer race mounting surface and suitable outer diameters for optimizing torque and moment of inertia in relation to loading. It is to be understood that alternative combinations of dynamically balanced weight 84b configurations may be distributed between the support frames 84a for changing torque/inertia characteristics such as, for example, the concentrated loading induced by a rim or plurality of segmented rim weights with comparatively large inner diameters closely positioned near the outer edges between support frames 84a (FIG. 4). The weights 84b are incrementally movable to permit precise load adjustments in congruence with long term environmental effects or intercomponent adaptation at the point of assembly. The outside of a respective flywheel support frame 84a carries a transmission 94 comprising an internal gear 94a in driving engagement with a plurality of pinion gears 94b. The respective pinion gears 94b are suitably affixed to the driveshafts of direct current electrical generators 96. The generator 96 plurality is conventionally seated in proper alignment by common end mounts 98 forming secure attachment means to the lower buoyancy chamber 18 wall. The electrical leads 86a,b of a respective generator 96 plurality are self-connected in series and further series-connected with the other generator groups within a module. Accordingly, the combined module electrical leads 86a,b are still further series-connected with other electrical leads of a module array by means of the framing member 38 conductors 88a,b to culminate at a single pair of output terminals. The size and number of engaging generators 96 is predetermined, in part, by the appropriateness of transmission 94 pitch diameters and gear speed ratios relative to the average flywheel 84 input torque and the required generator 96 plurality overturning moment of inertia. Ordinarily, three equispaced generators 96 are used in close-packed arrangement so that their eccentric driveshaft pinion gears 94b collectively mesh with the common internal gear 94a. Thus, the transmission 94 converts relatively low frequency driveshaft 62 input oscillations to upgraded output velocity at the generators 96. Though the above-described fixed gear ratio transmission 94 is adequately efficient over an average range of wave conditions, generator 96 speeds are solely increased by relative acceleration of an associated float 50,54 due to ambient wave profile and/or frequency amplification. Thee is no provision of changing gear speed ratios between a flywheel 84 and generators 96 in concurrence with loading changes induced over time. For example, when starting from rest, the input torque from successive driveshaft 62 strokes accelerates a flywheel 84, transmission 94, and generators 96 at changing rates until such instance as said driven elements attain average velocities with respect to their total overturning moment of inertia. At this instant, less driveshaft 62 input torque is used to sustaining momentum of the driven elements. Therefore, this type of fixed ratio transmission is optimally suited for use with appropriately sized modules deployed in water environments having predictably steady levels of wave energy. For water environments of less predictable wave conditions, modules having an alternate assembly of energy converting elements are preferably used.

The combined front elevation and section view of FIG. 4 illustrates a preferred energy converting assembly particularly suitable for use with modules deployed in usually random seas. The assembly includes the aforementioned means for converting reciprocative movement of a driveshaft 62/rack 68 to unidirectional rotation of a flywheel support frame 84a and weights 84b. Propitious weight 84bb configurations of this embodiment comprise rim shapes, or segmented rim portions thereof, concentrically disposed in close proximity to the outer regions between support frames 84a. The rim weights 84bb are so concentratively positioned about the support frames 84a periphery so as to increase the flywheel 84 moment of inertia in relation to loading. The outside of a respective flywheel support frame 84a carries an alternate speed enhancement apparatus usually embodying a harmonic drive transmission 100. This transmission 100 assembly comprises four basic components: a dybnamic internal gear 100a with mounting holes, a fixed internal gear 100b with mounting holes, a flexible external gear 100c, and a rotatable elliptical bearing 100d with shaft mounting means. In typical installations for increasing output speed, the non-rotating internal gear 100b is fixedly secured by mounting means 102 within the buoyancy chamber 18,30 to provide mechanical grounding for the transmission 100. The flexible gear 100c, having the same number of teeth as the fixed gear 100b in meshing engagement therewith, is thereby prohibited from rotation. The dynamic gear 100a, having two more teeth than the fixed gear 100b and flexible gear 100c in meshing engagement therewith, is thereby freely rotatable. Accordingly, the dynamic gear 100a is fixedly secured to the outside of a respective flywheel support frame 84a so that input rotation from said gear 100a progressively changes the position of deflection in said flexible gear 100c. Thus, the deflecting flexible gear 100c induces relative rotational advancement of the contacting elliptical bearing 100d equal to two teeth per revolution. By these means, the gear speed ratio is continuously increased as a function of loading changes induced over time to accelerate a single, relatively enlarged direct current electrical generator 104 conventionally attached to the elliptical bearing 100d shaft mounting means. It is to be understood that a further alternative speed increaser may comprise combined assemblies of the aforementioned transmissions 94,100 such as, for example, a harmonic drive elliptical bearing element suitably adapted with an internal gear in meshing engagement with a plurality of output pinion gears affixed to respective electrical generators. Although only diagrammatically represented by dashed lines in FIG. 2, the scope of the invention also permits utilization of similar, though proportionately diminished, transmission and electrical generation means 106 for conversion of the less energetic driveshaft 62/rack 68 downstroke forces. Power generated from these forces may be used for optional inner and inter module servomechanism functions such as bathometer actuated water pump ballast control or condensated water removal or any of a variety of requisite purposes.

Figure 5:
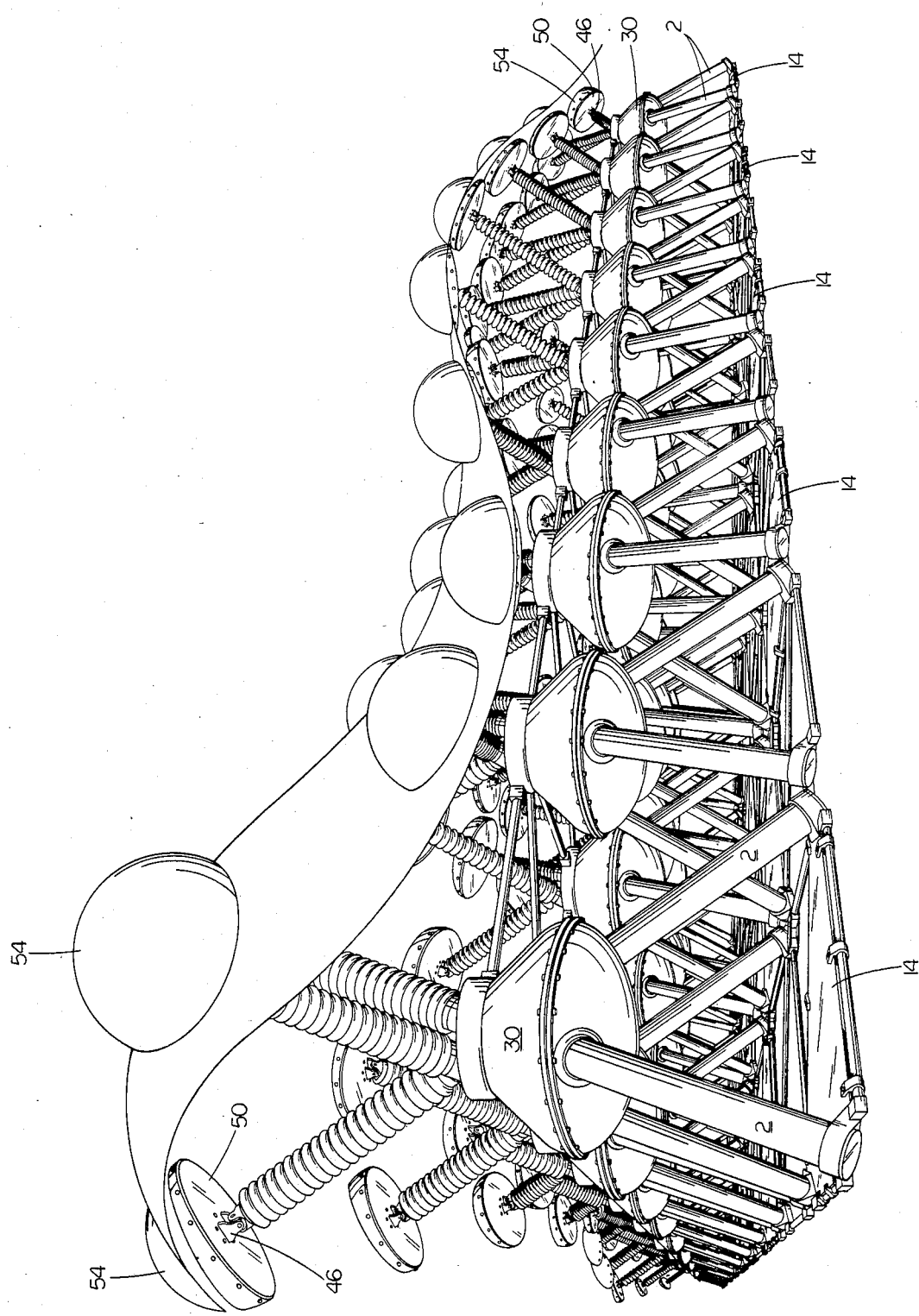
FIG. 5 is a side perspective view illustrating the operation of several connected ocean wave energy converter modules.

In the operation of the apparatus, with reference to the aforedescribed drawing figures and particularly the side perspective view of FIG. 5, an ocean wave energy converter module or plurality of interconnected modules thereof is flotationally suspended in a body of water with the floats 50,54 partially submerged at the hydroface and the rest of the structure totally submerged. The submerged portions of respective modules are buoyantly neutralized at preferred working depth by maintenance of appropriate displacement to ballast relationships thereby providing self-stabilized units which may be interconnected in octet truss configurations and thereby expanded to any desired extent without truss deflection. Maintenance of preferred working depth is augmented by utilization of damper plates 14, appropriately disposed at water depths relatively free of hydroface turbulence, thus providing stabilizing effects to respective modules. Because the dampening capabilities of the plates 14 are considerable, said plates 14 may be intermittently spaced amongst a module plurality as required for effecting stabilization in accordance with average on-site wave conditions. The damper plates 14 also function as sea anchors, thereby counteracting the tendency of the structure to drift off-station. As a result, only light bottom slack moorings are necessary for locating a module plurality in a desired area. Ocean wave crests impinging on the open truss structure cause partial submergence of respective floats 50,54 which subsequently rise at buoyancy restoring rates equal to their water displacement less material weight and loading of associated energy conversion means. Quick actuation of float 50,54 displacement from the retracted position is promoted by hydrodynamic shape enhancement of said lower float 50 portion into generally planar form to thereby increase hydroface resistance and decrease actuation time delay after submergence. Resistance is further increased by the universal or flexible joints 46 which permit self-adjustment of a lower float 50 portion for continuously optimizing the orientation of planar contact in relation to changing wave form procession. Another hydrodynamic effect is induced on the floats 50,54 by the shape enhancement of said upper buoyancy chamber shell 30 into generally conical form to thereby upwardly redirect at least some of the impinging water wave laminar flow. The wave following capability is also assisted by the driveshaft 62 inclined axis of reciprocation to thereby increase capture width and duration of engagement. Upward motion of a float 50,54 raises the associated driveshaft 62/rack 68 from within a tube 2. The displacement of a tubular driveshaft 62 is continuously increased during protrusion thereby partially assisting the wave-following capability of a float 50,54. The correlated linear slide bearings 64 greatly reduce frictional resistance between a driveshaft 62 and tube 2 and, thus, most of the lifting force is translated for converting reciprocal movement of a rack 68 into rotary motion of a meshingly engaged spur gear 76 with axle 78. The radial bearings 80 further diminish translational friction while supporting the axle 78 with gear 76 in rolling contact engagement. Rotation of the axle 78 imparts rotation to the affixed overrunning clutch 92 inner and outer races due to the occurence of positive sprag engagement thereby further imparting rotation to the circumjacently mounted flywheel 84. The overturning flywheel 84 advances the externally attached first described transmission 94 comprising an internal gear 94a in meshing engagement with a plurality of pinion gears 94b. By these fixed gear ratio transmission 94 means, the associated driveshafts and armatures of a generator 96 plurality are accelerated to relatively higher velocities and electrical energy outputs. As wave crests move through and away from the structure, upward float 50,54 and driveshaft 62 motion decreases and ceases thereby disengaging the clutch 92 sprags from the races. Resultantly, momentum of the freewheeling flywheel 84 is partially diminished by loading of the generator 96 plurality and friction. The ensuing downward motion of a float 50,54 and driveshaft 62 provides substantially less force due to their inherent buoyancy and, thus, energy conversion means 106 operating from these forces are necessarily reduced in size. In smaller modules, the maximally attainable downstroke forces may be insufficient for efficient conversion thereby eliminating the usefulness of conversion means 106. Therefore, these means 106 are optionally utilized in larger modules having relatively heavy floats 50,54 and/or driveshafts 62. As wave procession moves the troughs through and away from the structure, the floats 50,54 are again partially submerged and buoyantly lifted by impinging crests to reactuate acceleration of a flywheel 84 and generators 96. Subsequent repetitions of this described cycle tend to smooth flywheel 84 momentum and generator 96 output speeds to moderately constant velocity as predetermined by the appropriateness of fixed gear ratios relative to input torque and loading. As previously described, changes to constant velocity of a transmission 94 and generators 96 are solely induced by changes of ambient wave profile and/or frequency activity on the floats 50,54 and driveshafts 62.

In the operation of the second described harmonic drive transmission 100 and electrical generation means 104, an overturning flywheel 84 with attached dynamic gear 100a induces changing wave deflection in the fixed flexible gear 100c. Because the flexible gear 100c has two less teeth than the dynamic gear 100a to which it is meshingly engaged, the position of wave deflection in said gear 100c is relatively advanced two teeth per revolution thereby relatively advancing the contacting elliptical bearing 100d and associated electrical generator 104 driveshaft an equivalent distance. Therefore, when starting from rest, the gear speed ratio between a flywheel 84 and generator 104 is nearly even thus transferring most of the driveshaft 62/rack 68 input torque to overturning said flywheel 84 and generator 104 loads.

As a flywheel 84 gains momentum, the required overturning input torque is diminished. Concurrently, subsequent revolutions of the transmission 100 continuously increase the gear speed ratio between said flywheel 84 and generator 104 due to the intrinsic two tooth per revolution advancement. Thus, most of the input torque is transferred from accelerating the flywheel 84 to maintaining acceleration of the generator 104. For example, in long crested waves which induce low loads on the floats 50,54, the gear speed ratio is increased at relatively slow rates thereby maintaining nearly even distribution of input torque between a flywheel 84 and generator 104 for longer durations. This relationship promotes greater acceleration of both driven elements until such eventuality as most torque may be transferred. In more energetic seas, where randomly mixed wave activity is prevalent, relatively high loads are induced on the floats 50,54 thereby raising flywheel 84 velocity and gear speed ratios at faster rates. Thus, changes to generator 104 velocity are induced by changes of both the ambient wave profile and/or frequency activity and appropriate self-tuning of the gear speed ratio. By these variable ratio transmission 100 means, the associated driveshaft and armature of a generator 104 are driven to the highest velocity attainable from flywheel 84 momentum over an extensive range of wave energy input. Accordingly, the combined electrical outputs of a module are additively combined with the outputs of other interconnected modules by the afore-described series-connections through conductors 88 to culminate at a single pair of output terminals.

The invention is generally useful for a variety of purposes. The direct current electrical output of relatively few modules is particularly suitable for operating remote signalling and monitoring equipment. The output of a larger quantity of modules may be used as primary or back-up power for offshore resource recovery operations and, still further, several hundred to several thousand ocean wave energy converters may power large scale desalination or hydrogen production processes.

It is within the scope of the present invention to make such variations and modifications as would be apparent to a person of ordinary skill in this art including the substitution of obvious equivlents to those illustrated as mere examples of typical and preferred embodiments of the invention.

Having described my invention, I claim:

1. Apparatus for converting the energy of wave motion on the surface of a body of water to electricity comprising:
    (a) a plurality of lower structural support means approximately forming edge elements of an equilateral triangle;
    (b) a plurality of lower tube receptacles connected to said lower structural support means approximately forming vertex elements of an equilateral triangle;
    (c) a plurality of tubular members having upper and lower portions positioned within said tube receptacles approximately forming trimetric edge elements of a right conical frustum;
    (d) a separable buoyancy device affixed to the upper portions of said tubular members above said lower structural support means, said buoyancy device having upper and lower surfaces and an enclosed space therein;
    (e) an annulated receptacle plate affixed to said upper surface of said buoyancy device;
    (f) a plurality of truncated right circular cylinders connected to said annulated receptacle plate extending outwardly in coaxial alignment with respective tubular members;
    (g) a plurality of articulated brackets connected to said annulated receptacle plate in radial extension;
    (h) a plurality of upper structural support means connected to said articulated brackets in radial extension for connection to other receptacle plate articulated brackets of a module array;
    (i) dual rolling contact support means comprising open linear slide bearings operatively positioned within said tube upper portions and said truncated cylinders.

2. the apparatus recited in claim 1, further including:
    (a) a reciprocable driveshaft having upper and lower ends and a coaxially extending rack longitudinally supported in rolling contact engagement within said linear slide bearings wherein said rack protrudes in the bearing openings thereby inhibiting driveshaft axial torque and whereby the axis of said reciprocation is inclined from vertical orientation for increasing stroke length and duration of wave engagement;
    (b) a universal or flexible joint operatively connected to said driveshaft upper end;
    (c) a separable float device operatively connected to said universal or flexible joint, said float device having upper and lower surfaces and an enclosed space therein;
    (d) a removable stop affixed to said driveshaft lower end;
    (e) shock absorbing means operatively positioned within said tubular members for contacting said stop for limiting upward and downward strokes and reducing load transfer;
    (f) continuous rotary motion generation means operatively connected in driving engagement with said reciprocable driveshaft;
    (g) transmission means and electrical energy production means operatively connected in driving engagement with said continuous rotary motion generation means.

3. The apparatus recited in claim 2, wherein transmission means and electrical energy production means comprise a harmonic drive operatively connected in driving engagement with said continuous rotary motion generation means and a single direct current generator wherein said transmission means are adapted to vary the gear speed ratio and torque relations for maximally increasing output velocity in accordance with an extensive range of water wave conditions.

4. The apparatus recited in claim 2, wherein transmission means and electrical energy production means comprise an internal gear operatively connected with said continuous rotary motion generation means and a plurality of operatively meshing pinion gears operatively connected in driving engagement with a plurality of direct current generators arranged in close-packed configuration wherein fixed gear speed ratio and torque relations are preselected for increasing output velocity in accordance with a predetermined average range of water wave conditions.

5. The apparatus recited in claim 2, wherein continuous rotary motion generation means comprise, (a) a rack meshing spur gear affixed on a freely rotatable axle positionally secured in rolling contact engagement with radial bearings whereby said axle is extended from at least one side of said radial bearings, (b) an overrunning clutch having inner and outer portions affixed on said axle extension whereby said clutch inner portion provides numerous positively engaging load points with said clutch outer portion in one direction of rotation and lift-off disengagement in the opposite direction of rotation, (c) a flywheel operatively connected with said overrunning clutch for being driven in one direction of continuous rotation by momentum of a plurality of discrete weight elements fixedly superposed between support frames mounted to said clutch outer portions and wherein said elements are incrementally movable as required for adjusting loads in congruence with long term environmental effects or intercomponent adaptation at the point of assembly.

6. The apparatus recited in claim 5, wherein said flywheel weight elements are shaped as disks with relatively uniform thickness between said clutch outer portions and said flywheel outer portions.

7. The apparatus recited in claim 5, wherein said flywheel weight elements are shaped as rims, or segmented rim portions thereof, and concentratively positioned about said flywheel periphery for increasing overturning inertia in relation to loading.

8. The apparatus recited in claim 2, wherein said float device lower surfaces are shaped in generally planar form for increasing hydroface resistance and quick actuation after submergence and upper surfaces are shaped in generally hemispherical form radially symmetrical about the associated universal or flexible joint center of gyration, said radial length being preselected for prohibiting contact interference with other respective floats in normal operation and whereby said float lower surface is naturally adjustable for optimizing the orientation of planar surface resistance in relation to procession of continuously changing wave forms.

9. The apparatus recited in claim 1, wherein said buoyancy device upper surfaces are shaped in generally conical form for upwardly redirecting at least some water wave laminar flow toward float devices.

10. The apparatus recited in claim 2, wherein said float device enclosed space contains closed cell foam for prohibiting water infiltration and increasing float shell resistance to breaks and/or punctures whereby said shell wall thickness and weight is accordingly reduced in comparison to the required wall thickness and weight of a float device devoid of interiorly disposed closed cell foam.

11. The apparatus recited in claim 1, further including removable damper plates adapted to be carried on lower structural support means for stabilizing a module, or plurality of modules, as required.

12. The apparatus recited in claim 2, further including proportionately diminished transmission means and electrical energy production means adapted to be utilized in relatively large modules for converting the less forceful energy of downward driveshaft and float movement.

13. The apparatus recited in claim 1, wherein respective articulated brackets and upper structural support ends further include modified quick disconnect couplings for sealing end openings and electrical leads and conductors against water penetrations when detached.

14. The apparatus recited in claim 2, wherein ends of universal or flexible joints connecting a respective float and driveshaft are freely rotatable for inhibiting axial torque in normal operation.

* * * * *